though satisfactory for rendering poly-

United States Patent Office 3,284,277
Patented Nov. 8, 1966

3,284,277
LAMINAR STRUCTURES OF POLYVINYL FLUOR-IDE AND METHOD OF MANUFACTURE
John C. Bonacci, Germantown, Pa., and Leon E. Wolinski, Buffalo, N.Y., assignors to E. I. du Pont de Nemours and Company, Wilmington, Del., a corporation of Delaware
No Drawing. Filed June 14, 1965, Ser. No. 463,949
17 Claims. (Cl. 161—188)

The present invention is directed to improvements in and relating to a novel film structure of thermoplastic polymeric material and, more particularly, is directed to a novel laminar structure of polyvinyl fluoride film and unsaturated polyesters and to methods for preparing such laminar structures.

The present application is a continuation-in-part application of copending application Serial No. 177,505, filed March 5, 1962, now abandoned.

The use of preformed polyvinyl fluoride films, previously rendered suitably surface receptive, as mold release sheets in the production of fiber-reinforced polyester structures during the cure of which the polyvinyl fluoride layer becomes integrally bonded to the fiber-reinforced polyester structure (i.e., without an intermediate adhesive layer) is fully described and claimed in copending U.S. patent application Serial No. 38,523, filed June 24, 1960, in the name of David Ivan Sapper.

The methods described by Sapper (page 10, line 22, to page 12, line 8) although satifsactory for rendering polyvinyl fluoride films suitable for use in the preparation of fiber-reinforced polyester structures having a layer of polyvinyl fluoride film firmly adhered thereto characterized by initially strong, unpeelable bonds between the polyvinyl fluoride film and the polyester, these various methods are by no means equivalent when it comes to producing film-to-unsaturated polyester bonds exhibiting the long term hydrolytic stability deemed essential for satisfactory commercial exploitation of the outstanding outdoor weathering characteristics of these composite structures. It has been found that the electrical discharge treatment described by Sapper (page 12, line 1–8) suffers from a serious drawback in that it does not provide bonds of sufficient long term hydrolytic stability, as will be more fully explained hereinafter.

It is, therefore, an object of this invention to provide a method for the preparation of laminar structures of polyvinyl fluoride film utilizing an electrical discharge treatment of the surface or surfaces thereof, especially as will permit the employment thereof as mold release sheets in the production of fiber-reinforced unsaturated polyester laminar structures, during the cure of which the polyvinyl fluoride layer becomes integrally bonded to the fiber-reinforced unsaturated polyester structure to provide a unitary structure characterized by a polyvinyl fluoride film-to-unsaturated polyester bond exhibiting resistance to hydrolytic attack to a degree not obtainable by other electrical discharge treating techniques.

According to the present invention there is provided a method for preparing laminar structures of polyvinyl fluoride and unsaturated polyester which comprises subjecting at least one surface of a polyvinyl fluoride film structure to an electrical discharge in a gaseous atmosphere consisting essentially of ammonia; contacting at least one treated surface of said polyvinyl fluoride film structure with an unsaturated polyester polymeric material consisting essentially of at least one unsaturated organic linear polymeric ester having recurring ethylenic unsaturation and at least one addition-polymerizable ethylenically unsaturated organic monomer; and curing said polyvinyl fluoride film and unsaturated polyester to form a cured laminar structure comprising at least one layer of polyvinyl fluoride integrally bonded to at least one layer of said unsaturated polyester.

In a preferred embodiment, the present invention is directed to a method for preparing laminar structures of polyvinyl fluoride and unsaturated polyesters which comprises subjecting at least one surface of a polyvinyl fluoride film to an electrical discharge in a gaseous atmosphere consisting essentially of ammonia by, preferably, passing said polyvinyl fluoride film between parallel electrodes spaced to provide a gap therebetween of from 0.001 to 0.50 inch, preferably from 0.005 to 0.125 inch, continuously applying across said gap a difference in electrical potential of at least 1000 volts, preferably from 2,000 to 100,000 volts, alternating at a frequency of at least 60 cycles per second, preferably from 200,000 to 500,000 cycles per second, effective to create and maintain an electrical discharge therebetween characterized by an alternating current of from about 0.5 to 5.5, preferably from 0.5 to 3.5 radio frequency amperes, and continuously maintaining between the electrodes a gaseous atmosphere consisting essentially of ammonia, contacting at least one treated surface of said polyvinyl fluoride film with an unsaturated polyester consisting essentially of at least one unsaturated organic linear polymeric ester having recurring ethylenic unsaturation and at least one addition-polymerizable ethylenically unsaturated organic monomer, and curing said polyvinyl fluoride film and unsaturated polyester to form a cured unitary structure comprising at least one layer of polyvinyl fluoride and at least one layer of said polyester.

The invention involves three interrelated essential and critical requirements, and in order to obtain the improvements of the present invention, particularly the resistance of the unitary laminar structure to hydrolytic degradation, it is essential and necessary to (1) utilize polyvinyl fluoride film, (2) subject the polyvinyl fluoride film to an electrical discharge in a gaseous atmosphere consisting essentially of ammonia, and (3) contact the treated polyvinyl fluoride film with an unsaturated polyester polymeric material.

While it has been found as in Sapper mentioned above that the surfaces of polyvinyl fluoride film can be rendered printable and/or adhereable to a wide variety of coatings and adhesive compositions by subjecting the polyvinyl fluoride film to the action of an electrical discharge in gaseous atmospheres containing many widely differing organic and/or inorganic agents, it has been discovered unexpectedly that only when the gaseous atmosphere consists essentially of ammonia are the surfaces of the polyvinyl fluoride films so modified that they become integrally bonded to an unsaturated polymeric ester curing in situ, said bonds being highly resistant to degradation by hydrolytic attack.

Polyvinyl fluoride film utilized in the method of the present invention may be manufactured by a variety of methods. A particularly useful method for making polyvinyl fluoride film consists of the steps of feeding a latent solvent/particulate polyvinyl fluoride mixture to a heated extruder which is connected to a slotted casting hopper, from whence a tough, coalesced solvent-containing polyvinyl fluoride film is continuously extruded. This latent solvent-containing film is then stretched longitudinally over heated rolls and then transversely in a tenter frame, in which it is held in restraint while the remaining latent solvent is volatilized. These extrusion and stretching procedures are described in detail in U.S. Patent 2,953,818 and in copending U.S. patent application Serial No. 801,441, filed March 24, 1958, in the names of Robert Smith Prengle and Rober Laurence Richards, Jr. Polyvinyl fluoride film that can be successfully employed in the process of the present invention also may be prepared by casting onto suitably smooth surfaces any of the more fluid latent solvent/particulate polyvinyl fluoride compositions described in U.S. Patents 3,000,843 and 3,000,844, followed by heating to coalesce the polymer particles into a unitary film and subsequently heating to volatilize the remaining latent solvent. Polyvinyl fluoride films found to be particularly useful for treatment and therefore particularly useful in the process of the present invention are those biaxially oriented films which exhibit from about 0.2% to about 5.0% shrinkage in each direction of stretch when exposed for 30 minutes in a circulating air oven maintained at 60° C.

If desired, various color and/or opacifiers may be incorporated into the polyvinyl fluoride film during the preparation thereof. Polyvinyl fluoride films containing ultraviolet light screening agents such as polymeric orthohydroxybenzophenones have been found particularly useful when utilized in the method of the present invention for the preparation of fiber-reinforced polyester structures.

In subjecting the polyvinyl fluoride film to the electrical discharge, any convenient arrangement of a pair of electrodes between which the film can be passed and an electrical discharge maintained therebetween while surrounding the electrodes in a gaseous atmosphere consisting essentially of ammonia may be employed. A preferred electrode arrangement consists of an electrically grounded rotatable metal roll and a stationary elongated electrode mounted close to the surface of and parallel to the longitudinal axis of the electrically grounded roll. For convenience, the stationary electrode will hereinafter be called the treating electrode. One or more treating electrodes may be employed in cooperation with a single electrically grounded rotatable metal roll. The treating electrodes can be in the form of solid metal rods or bars, flat or tapered metal strips or in the form of hollow metal tubes through which ammonia can be conveniently introduced into the treating zone, i.e., zone of electrical discharge. In the preferred electrode arrangement, the treating electrode is preferably spaced from the surface of the electrically grounded metal roll to provide a gap of 0.005 inch to 0.125 inch. Satisfactory results can be obtained with electrode gaps as low as 0.001 inch or as high as 0.50 inch, provided suitable adjustments are made in the power supplied to the treating electrode, the dimensions of the treating electrode itself and the time of exposure of the polyvinyl fluoride film surface in the electrode gap.

The potential difference between the electrodes can vary from voltages in the vicinity of 1,000 volts up to pulsating peak voltages as high as 100,000 volts and above. In general, it is preferred to maintain the voltage above 2,000 volts, i.e., 2,000–100,000 volts. Frequencies ranging from 60 cycles per second to 1,000,000 or more cycles per second can be used. Frequencies in the range of 200,000–500,000 cycles per second are preferred in order to obtain effective treatment at commercially acceptable exposure times. A convenient and commercially available source of power for the electrodes is a high frequency spark generator such as the H.F.S.G. units manufactured by Lepel High Frequency Laboratories, Inc., Woodside, New York.

In general, for a given area of electrode, the effectiveness of the treatment increases with the amount of current flowing in the treating electrode circuit and also increases with the time of exposure of the film surface in the electrode gap. Generally, this exposure time is very brief, in the order of from about 0.005 to 1.0 second. Conversely, the effectiveness of the treatment decreases with increasing speed of film travel through the electrode gap. Currents in the treating electrode circuit ranging from 0.5 to 5.5 R.F. (i.e., radio frequency), amperes, or even higher can be employed. However, a range of 0.5–3.5 R.F. amperes is ample for most electrode configurations, thus permitting reasonable film throughput speeds while at the same time avoiding overheating of the treating electrode.

Annonia can be continuously supplied to the electrode gap either through the slotted hollow tubular treating electrode mentioned above or through an electrically non-conductive (e.g., glass, ceramic or plastic) sparger, i.e., a gas delivery tube disposed parallel to the treating electrode, close to the film surface and the treating electrode, and preferably on the upstream side (based on the direction of film travel) of the treating electrode. The sparging tube should be slotted or perforated in that portion of its circumference facing more or less directly into the electrode gap.

Satisfactory results have been obtained in carrying out the method of the present invention while supplying ammonia to the electrode gap at rates ranging from as low as 0.5 to as high as 25 cubic feet per minute. No adverse effects have been observed in the use of higher flow rates, though economic consideration would dictate against the use of rates exceeding those required to produce the desired effect. It is only necessary that the ammonia be supplied continuously in sufficient quantity to displace substantially all of any ambient gaseous atmosphere in the electrode gap. It will be apparent that the width of the electrode gap, the width of the film being treated, its speed through the gap and the specific mode of supplying the ammonia to the zone of electrical discharge will each have some effect on the amount of ammonia required to accomplish the desired result. As an aid to maintaining a higher concentration of ammonia in the zone of electrical discharge, a shield can be employed to encompass the treating electrode (and, if necessary, a sparging tube) and a narrow zone immediately on either side of the treating electrode. Such a shield could be positioned so that its edges would come close to but not in contact with the surface of the film passing through the electrode gap.

It should be understood that polyvinyl fluoride films can be treated at normal room temperature or at elevated temperatures and at normal atmospheric pressure. In general, the effectiveness of the treatment increases with increases in temperature of treatment.

The unsaturated polyester employed in the method of the present invention is preferably a mixture consisting essentially of (1) at least one organic linear polymeric ester containing recurring ethylenic unsaturation and (2) at least one addition-polymerizable, ethylenically unsaturated organic monomer.

Unsaturated polymeric esters suitable for use in combination with polyvinyl fluoride films in the manner of the present invention include those employed commercially, and any as are prepared by condensing under polymerizing conditions either (1) an ethylenically unsaturated dicarboxylic acid with a diol containing no ethylenic unsaturation, or (2) a dicarboxylic acid containing no ethylenic unsaturation with an ethylenically unsaturated diol, or most commonly, (3) a mixture of ethylenically unsaturated dicarboxylic acids and dicarboxylic acids containing no ethylenic unsaturation with a diol containing no ethylenic unsaturation. Where stable dichlorides, diesters or anhydrides of the dicarboxylic acids are available, they can be and are often substituted therefor.

Among the ethylenically unsaturated dicarboxylic acids and derivatives thereof which are commonly employed can be mentioned fumaric acid, maleic acid and its anhydride, citraconic acid, mesaconic acid, itaconic acid and endomethylene tetrahydrophthalic acid. Among the dicarboxylic acids and derivatives thereof containing no ethylenic unsaturation which are commonly employed can be mentioned phthalic acid and its anhydride, adipic acid, sebacic acid, isophthalic acid, terephthalic acid, malonic acid, and glutaric acid.

A frequently employed ethylenically unsaturated diol is 2-butene-1,4-diol while among the commonly employed diols containing no ethylenic unsaturation can be mentioned ethylene glycol, propylene glycol, diethylene glycol and dipropylene glycol. As will be obvious to those skilled in the art, varying the proportions and nature of the ethylenically saturated and unsaturated reactants in these condensations affects the number of carbon-to-carbon double bonds in a given polymer chain length available for cross-linking by addition-polymerization means.

Among the addition-polymerizable compounds most commonly employed as cross-linking agents in combination with the above-described polyesters can be mentioned styrene, diallyl phthalate, methyl methacrylate and triallyl cyanurate. Other ethylenically unsaturated cross-linking agents more or less frequently employed in these operations include alpha-methylstyrene, divinyl benzene, vinyl toluene, allyl diglycolate, methyl acrylate, ethyl acrylate, ethyl methacrylate, vinyl acetate, acrylonitrile, diallyl maleate, vinyl phenol, and allyl carbamate. Frequently more than one of the above cross-linking agents is employed in the same mixture, depending on the properties desired in the final structure and its ultimate use.

Fillers such as pigments, clays, mica, silica, talc, etc., can be incorporated into the unsaturated polyester mixture prior to curing. While some of the addition-polymerization cross-linking reactions proceed spontaneously at normal temperatures, heat is frequently used to accelerate the reaction. Accelerators or promoters such as cobalt naphthenate, phenyl phosphinic acid, p-toluene sulfonic acid and some tertiary amines, e.g., dimethyl aniline, etc. are also frequently employed. Catalytic initiators such as benzoyl peroxide, t-butyl peroxide, di-t-butyl peroxide, methyl ethyl ketone peroxide, cyclohexane peroxide, organic azo compounds, and lauryl peroxide are also frequently employed to insure reactivity within a reasonable time. Ultraviolet light absorbing compounds and antioxidants can also be frequently incorporated into these mixtures.

Reinforcing fiber is preferably additionally incorporated into the unsaturated polyester mixture. Any suitable reinforcing fiber may be employed such as, for example, asbestos, nylon, cellulosic and like mineral and organic fibers, and glass reinforcing fibers are preferred, particularly from the strength-versus-coat standpoint. Fibrous glass is available for reinforcing structures in the form of cloth, yarns, mats, rovings, milled fibers, parallel strands, surfacing mats and loose fibers. The selection of the particular form in which the glass fibers are to be used and the quantity thereof in proportion to the other ingredients in the mixture permits wide latitude and is a further means of varying the properties of the final structure, in addition to varying the proportions and specific nature of the polyester and cross-linking agents respectively.

The curing of the composite structures resulting from the use of polyvinyl fluoride films and unsaturated polyesters in the manner of the present invention can be accomplished by any of the commonly employed low pressure molding techniques including vacuum-bag, pressure-bag and matched metal dies. The addition-polymerization cross-linking reactions are generally quite exothermic and some care is usually taken to prevent the temperatures of the reacting mass from rising so high as to boil off the cross-linking monomer before it has had an opportunity to completely react. The specific duration and temperature history of the cure will depend on many variables including the proportions and specific natures of the reacting ingredients and catalysts as well, as in some cases, the physical bulk of the reacting mass.

The principle and practice of the present invention will now be illustrated by the following examples which are provided to show embodiments of the method contemplated thereby, but it is not intended that the invention be limited thereto since modifications in technique and operation will be apparent to anyone skilled in the art.

In the examples which follow, the polyvinyl fluoride films treated in specific embodiments of the present invention and those treated as control films were evaluated by the following procedure.

A 12 inch by 12 inch sample of the polyvinyl fluoride film was placed, treated side up, on a flat glass plate and a dam formed around its four edges with a length of $\frac{1}{16}$ inch diameter twine. A major portion of a degassed blend of unsaturated polyester resin formulation was then poured onto the polyvinyl fluoride film and allowed to flow and spread evenly over the area bounded by the twine. A 12 inch by 12 inch sample of chopped strand fiber glass mat weighing approximately 2 ounces was placed in the polymerizable unsaturated polyester layer and the remainder of the unsaturated polyester resin formulation poured over the top of the mat. After the resin mixture had welled up through the interstices of the mat and spread itself evenly in the area bounded by the twine, a slip sheet of uncoated cellophane, untreated polyvinyl fluoride film or a perfluorocarbon film such as can be fabricated from Du Pont's "Teflon" perfluorocarbon resins was placed on top, followed by another glass plate of sufficient size and thickness to place the entire area bounded by the twine under a pressure of approximately 0.64 ounce/in.$^2$. The entire sandwich was then placed in an oven and subjected to a curing cycle consisting of 15 mniutes at 100° C. followed by 7 minutes at 115° C. at which time the slip sheet and both glass plates were removed and the polyvinyl fluoride film-clad, glass fiber-reinforced polyester panel subjected to a post cure of 10 minutes at 150° C.

The bond of the polyvinyl fluoride film to the polyester structure was evaluated initially and at intervals during an accelerated test during which the panel was entirely immersed in boiling water. At these intervals, the bond strength was tested while the panels were still wet. The unsaturated polyester resin formulation employed in these evaluations, typical of those used commercially in the industry, is shown below:

159.4 grams of a mixture consisting of about 20% by weight of methyl methacrylate and about 80% by weight of an unsaturated polyester formed by reacting a slight stoichiometric excess of ethylene glycol with a mixture consisting of about 60 mol percent of phthalic acid and about 40 mol percent of maleic anhydride.

40.6 grams of styrene.

1.0 gram of benzoyl peroxide.

0.1 gram of a solution consisting of about 6 parts by weight of cobalt naphthenates and about 51 parts by weight of naphthenic acids dissolved in about 43 parts by weight of mineral spirits.

1.0 gram of a 60% solution of methyl ethyl ketone hydroperoxide in dimethyl phthalate.

The effectiveness of the various treatments described in the examples to follow was evalutaed by preparing glass fiber-reinforced unsaturated polyester panels according to the procedure previously described, followed by completely immersing the panels in boiling water and testing for bond strength at periodic intervals. The periodic examination (made while the panels were still wet) involved cutting through the polyvinyl fluoride film with a sharp knife and trying to pry up and peel back an edge of the film. A satisfactory composite structure is one in which this peeling cannot be started, referred to hereinafter as a CNS bond.

EXAMPLES 1–3

In Example 1, the edges of a rectangular sample of 1 mil thick biaxially oriented polyvinyl fluoride film exhibiting some shrinkage in both directions of orientation on exposure for 30 minutes at 60° C., were taped securely to an electrically grounded steel plate. The film surface away from the steel plate was subjected to the electrical discharge from the probe of a Fisher Scientific Company Model BD–10 Tesla-type leak tester held at a distance of approximately ¼ inch from the surface of the film and which traversed the surface of the film at the rate of about 20 ft./minute. The tester operated from a 60 cycle, 120 volt line source and was set for its maximum output of approximately 30,000 volts. A stream of ammonia (supplied from a pressure cylinder of liquid ammonia) was directed into the zone of electrical discharge via a length of polyvinyl chloride tubing, the delivery end of which was held close to the probe of the tester.

In Example 2, another sample of the same polyvinyl fluoride film was subjected to three passes of the probe as described in Example 1. Both Examples 1 and 2 were carried out at room temperature, i.e., about 25° C.

In Example 3, a third sample of the same polyvinyl fluoride film was subjected to the one-pass treatment described in Example 1 with the exception that the grounded steel plate was heated to a temperature of 75° C.

In control experiments O–1, O–2 and O–3, the procedures of Examples 1, 2 and 3 respectively were repeated except that oxygen instead of ammonia was supplied through the polyvinyl chloride tubing from a pressure cylinder of the liquefied gas.

In control experiments N–1, N–2 and N–3, the procedures of Examples 1, 2 and 3 respectively were repeated except that nitrogen instead of ammonia was supplied through the polyvinyl chloride tubing from a pressure cylinder of the liquefied gas.

Glass fiber-reinforced unsaturated polyester panels were prepared utilizing the polyvinyl fluoride film samples of Examples 1, 2 and 3, and the control experiments, in accordance with the procedure noted previously, and the fabricated panels were evaluated by immersion in boiling water and testing for bond strength at periodic intervals.

While all structures prepared from films treatetd according to the above procedures exhibited cannot start (CNS) bonds prior to immersion in boiling water, those structures made with the polyvinyl fluoride films treated in Examples 1 to 3 exhibited more than twice the boiling water life of the structures prepared in the control experiments.

EXAMPLES 4 and 5

A 50 inch wide roll of the polyvinyl fluoride film employed in Examples 1 to 3 was continuously unwound and conducted through the treating apparatus wherein it passed in sequence (1) over a guide roll and into contact with a driven, electrically grounded rotatable steel roll (50 inches long and 12 inches in diameter), (2) under a hollow tubular treating electrode positioned parallel to the longitudinal axis of steel roll, and (3) over a guide roll and through haul-off nip rolls. The tubular treating electrode consisted of a 3⅞ inch O.D., 50 inch long stainless steel tube, closed at both ends and having a 50 to 60 mil wide lengthwise slot positioned facing the electrically grounded steel roll. The gaseous atmosphere supplied to the zone of electrical discharge was supplied through several electrically non-conducting tubes into a perforated 1¼ inch O.D. stainless steel distributor pipe mounted concentrically within the tubular treating electrode and subsequently issued from the aforementioned slot therein. The tubular treating electrode was positioned approximately 0.015 inch from the surface of electrically grounded steel roll and was connected to the high voltage terminal of a Model H.F.S.G.–6 High Frequency Spark Generator manufactured by Lepel High Frequency Laboratories, Inc., Woodside, New York. This unit is a spark gap-excited high frequency oscillator specifically designed to generate a high frequency, high voltage electrical discharge between two electrodes and is adjustable to accommodate various load conditions.

In the following examples, the input power to the tubular treating electrode ranged from about 4800 to 5000 watts and the current flowing in the treating electrode circuit ranged from about 3.2 to 3.25 R.F. amperes.

The atmospheres supplied to the zone of electrical discharge indicated in Table I which follows were supplied at the rate of about 3 cubic feet per minute. Results of the boiling water test conducted on the polyvinyl fluoride film-clad polyester panels again show the tremendous advantage imparted by the presence of ammonia in the zone of electrical discharge.

TABLE I

| Example Number | Film Speed, ft./min. | Gaseous Atmos. | Ground Roll Temp., °C. | Laminate Evaluation | |
|---|---|---|---|---|---|
| | | | | Initial Bond | Boiling Water Life, Hours |
| 4 | 9.5 | NH³ | 25 | CNS | 3 |
| Control A–4 | 34 | Air | 25 | CNS | *0 |
| 5 | 15 | NH³ | 45 | CNS | 110 |
| Control A–5 | 34 | Air | 45 | CNS | 1.5 |

* Delaminated in boiling water in less than 5 minutes.

EXAMPLE 6

The procedure of Example 5 was repeated on a 23 inch wide roll of the same polyvinyl fluoride film traveling through the apparatus at 140 ft./min. with the electrically grounded steel roll maintained at 45° C. Instead of employing the hollow tubular treating electrode of Examples 4 and 5, a solid electrode was milled from a 22 inch long, 1 inch square steel bar to a trapezoid-shaped cross-section and ammonia was supplied through a polyvinyl chloride sparging tube positioned parallel to the longitudinal axis of the grounded steel roll and about ½ inch upstream from the electrode gap; the sparging tube was perforated with many small holes over that portion of its circumference facing more or less directly into the electrode gap. During treatment of the film, ammonia issuing from the sparging tube at the rate of about 3 cubic feet per minute, flooded the zone of electrical discharge.

In evaluating the effectiveness of this treatment, the initial bond for the polyvinyl fluoride film to the polyester structure was found to be CNS and the structure did not fail the boiling water test until after 260 hours.

EXAMPLES 7–12

A 50 inch wide roll of the polyvinyl fluoride film employed in Examples 1 to 6 was treated as in Examples 4 and 5 except that the solid bar treating electrode and sparger tube arrangement of Example 6 was used. For Examples 7 to 12, the treating electrode was milled from a 48 inch long, 1 inch square steel bar, differing only from the electrode of Example 6 in that the surface of the electrode facing the grounded steel roll was ¼ inch wide instead of ⅛ inch wide. A 0.010 inch gap was maintained between the electrode and the grounded steel roll. Power input to the electrode ranged from 4800 to 5000 watts and the current flowing in the treating electrode circuit ranged from about 3.- to 3.3 R.F. amperes. Ammonia (or oxygen were indicated in the following table) was supplied to the zone of electrical discharge at the rate of about 3 cubic feet per minute.

To evaluate the effectiveness of the various treating conditions, three samples of film were tested for each example and control, cut from left, right and center lanes of the web width. Polyvinyl flouride fiilm-to-unsaturated polyester bonds were tested initially and at selected intervals during a boiling water immersion. A CNS bond was given a rating of 2; a bond where the polyvinyl fluoride film could be peeled just a little but which would break off in little pieces, a rating of 1; a continuously peeling bond, a rating of zero. Initially and at each test interval, all three samples of a given example were rated and the ratings added to obtain a cumulative rating. Cumulative ratings are reported in Table II which follows.

TABLE II

| Example Number | Film Speed, ft./min. | Gaseous Atmos. | Ground Roll Temp., °C | Cumulative Bond Rating | | | | |
|---|---|---|---|---|---|---|---|---|
| | | | | Initial | After Boiling For Hours Indicated | | | |
| | | | | | 1.5 | 3.5 | 16 | 68 |
| 7 | 11 | NH₃ | 25 | 6 | 1 | 1 | 1 | 0 |
| 8 | 34 | NH₃ | 25 | 5 | 3 | 2 | 2 | 2 |
| Control | 34 | O₂ | 25 | 2 | 0 | | | |
| 9 | 77 | NH₃ | 25 | 5 | 3 | 3 | 1 | 1 |
| 10 | 12.5 | NH₃ | 45 | 6 | 4 | 1 | 1 | 1 |
| 11 | 34 | NH₃ | 45 | 6 | 6 | 4 | 3 | 3 |
| 12 | 77 | NH₃ | 45 | 6 | 3 | 1 | 5 | 4 |

EXAMPLE 13

This example is presented to illustrate the essential and critical requirements of the present invention above set forth, especially with regard to the necessity of using polyvinyl fluoride films as contrasted with films of a perfluorocarbon resin such as a copolymer of tetrafluoroethylene and hexafluoropropylene, and also the necessity of using an unsaturated polyester component in contrast to saturated polyester polymeric materials.

A. Comparison of polyvinyl fluoride and tetrafluoroethylene/hexafluoropropene films Following the procedure described in Examples 4 and 5, films of polyvinyl fluoride and of an 85/15 weight ratio tetrafluoroethylene/hexafluoropropene copolymer of the type described in U.S.P. 2,946,763 were subjected to electrical discharge in an atmosphere of ammonia. Instead of employing the hollow tubular treating electrode of Examples 4 and 5, a bar electrode was used, the surface of the electrode facing the grounded steel roll being ½ inch wide. Ammonia was supplied by a sparging tube feeding into the electrode gap. Film speed through the apparatus was 10 feet per minute.

Laminates of the treated films with fiber-reinforced polyester structures were prepared following the procedure above described. The unsaturated polyester used was a commercial adhesive, IC 312-2 from Interchemical Company, essentially a composition of about 8% of maleic anhydride and 92% of a 70/30 mixture of propylene glycol isophthalate/propylene glycol terephthalate.

The laminate made from the treated polyvinyl fluoride film showed initially a "CNS" bond; after boiling for 5 minutes, 1 hour, 8 hours and 24 hours the bond was still rated "CNS." The laminate made from the treated tetrafluoroethylene/hexafluoropropene copolymer film initially showed a bond strength of 4000 grams per inch; after five minutes' immersion in boiling water the sample delaminated. Similarly contrasting results were obtained with the polyvinyl fluoride and perfluorocarbon films which were treated with electrical discharge at film speeds of 3, 25 and 50 feet per minute.

B. Comparison of unsaturated versus saturated polyester adhesive

Following the procedure described in "A" above, a polyvinyl fluoride film subjected to electrical discharge treatment in an ammonia atmosphere at a film speed of 10 feet per minute and laminated to a fiber-reinforced structure of unsaturated polyester showed "CNS" bonds between the treated polyvinyl fluoride film and the unsaturated polyester even after exposure for 24 hours to boiling water.

For comparison, a laminate of a similarly treated polyvinyl fluoride film to a surface of saturated polyester adhesive consisting of a mixture of ethylene glycol esters of terephthalic, isophthalic and sebacic acids in the approximate weight ratio of 33/17/50 in methyl ethyl ketone solvent was prepared by coating the saturated polyester on the surface of an Alodine 1200S [1] aluminum strip, evaporating the solvent and contacting the adhesive surface with the treated surface of the polyvinyl fluoride film. The sandwich-type structure was placed in a Carver press and heated at 120° C. at 200 p.s.i. for five minutes. The laminate of polyvinyl fluoride film and saturated polyester showed an initial bond of 4600 grams per inch; after exposure to boiling water for five minutes the bond strength was 2800 grams per inch; after exposure to boiling water for 24 hours the bond strength was only 600 grams per inch. No improvement in adhesive bond was realized over that described above when the sandwich-type structure was pressed at higher temperature (150° C.) or when heated at the higher temperature and pressed for two hours or longer.

Polyvinyl fluoride film and fiber-reinforced unsaturated polyester structures prepared in accordance with the method of the present invention can be exposed outdoors to the ravages of weathering either continually or at least intermittently during their use life. Among such structures may be included boat hulls and superstructure, life rafts and their containers, automobile bodies and detachable hard-tops, radar canopies and other antennae housings, rain shelters, aircraft radomes, harbor and channel buoys, outdoor walk-in telephone booths, horse trailers, luggage trailers, some contour furniture, swimming pools, forms for reinforced concrete, geodesic domed structures such as barns, auditoriums, etc., storage tanks for water and chemicals, house trailers, baby carriages, skis, sleds, toboggans, safety helmets, luggage, helicopter rotor blades, surfboards, highway and building signs, tanks for truck transport of liquids, cargo van bodies, agricultural animal trailers and in the construction of housing and other buildings in the form of roofings and sidings, skylights, awnings, flashing, rain gutters, downspouts and overhead garage doors.

What is claimed is:

1. A method for preparing laminar structures of polyvinyl fluoride and unsaturated polyesters which comprises subjecting at least one surface of a polyvinyl fluoride film structure to an electrical discharge in a gaseous atmosphere consisting essentially of ammonia; contacting at least one treated surface of said polyvinyl fluoride film structure with an unsaturated polyester polymeric material consisting essentially of at least one unsaturated organic linear polymeric ester having recurring ethylenic unsaturation and at least one addition-polymerizable ethylenically unsaturated organic monomer; and curing said polyvinyl fluoride film and unsaturated polyester to form a cured laminar structure comprising at least one layer of polyvinyl fluoride integrally bonded to at least one layer of said unsaturated polyester.

2. The method of claim 1 wherein said unsaturated polyester polymeric material contains reinforcing fibers.

---
[1] Trade name for aluminum conversion product coated with hydrated aluminum oxide/hexavalent chrome complex, Amchem Co., Ambler, Pa.

3. The method of claim 1 wherein said unsaturated polyester polymeric material is derived from a mixture of ethylenically unsaturated dicarboxylic acids reacted with a diol, and the addition-polymerizable ethylenically unsaturated monomer is an alkyl-substituted acrylate.

4. A method for preparing laminar structures of polyvinyl fluoride and unsaturated polyesters which comprises subjecting at least one surface of a polyvinyl fluoride film to an electrical discharge between parallel electrodes spaced to provide a gap therebetween of from 0.001 to 0.50 inch and having a difference in electrical potential of at least 1,000 volts alternating at a frequency of at least 60 cycles per second effective to create and maintain an electrical discharge therebetween characterized by an alternating current of from about 0.5 to 5.5 radio frequency amperes, and continuously maintaining between said electrodes a gaseous atmosphere consisting essentially of ammonia; contacting at least one treated surface of said polyvinyl fluoride film with an unsaturated polyester consisting essentially of at least one unsaturated organic linear polymeric ester having recurring ethylenic unsaturation and at least one addition-polymerizable ethylenically unsaturated organic monomer; and curing said polyvinyl fluoride film and unsaturated polyester to form a cured laminar structure comprising at least one layer of polyvinyl fluoride integrally bonded to at least one layer of said unsaturated polyester.

5. The method of claim 4 wherein said unsaturated polyester contains reinforcing fibers.

6. A method for preparing laminar structures of polyvinyl fluoride and unsaturated polyesters which comprises subjecting at least one surface of a polyvinyl fluoride film to an electrical discharge between electrodes consisting of an electrically grounded rotatable metal roll and at least one stationary elongated electrode spaced close to the surface of and parallel to the longitudinal axis of said roll to provide a gap therebetween of from 0.005 to 0.125 inch and having a difference in electrical potential within the range of from 2,000 to 100,000 volts alternating at a frequency within the range of from 200,000 to 500,000 cycles per second effective to create and maintain an electrical discharge therebetween characterized by an alternating current of from about 0.5 to 3.5 radio frequency amperes, and continuously flowing gaseous ammonia through said gap at a rate within the range of about 0.5 to 25 cubic feet per minute to displace substantially all of any ambient gaseous atmosphere present in the electrode gap; contacting at least one treated surface of said polyvinyl fluoride film with an unsaturated polyester consisting essentially of at least one unsaturated organic linear polymeric ester having recurring ethylenic unsaturation and at least one addition-polymerizable ethylenically unsaturated organic monomer; and curing said polyvinyl fluoride film and unsaturated polyester to form a cured laminar structure comprising at least one layer of polyvinyl fluoride integrally bonded to at least one layer of said unsaturated polyester.

7. The method of claim 6 wherein said unsaturated polyester contains reinforcing fibers.

8. A laminar structure comprising at least one layer of polyvinyl fluoride surface activated by electrical discharge in the presence of ammonia integrally bonded to at least one layer of an unsaturated polyester.

9. The laminar structure of claim 8 having reinforcing fibers in said layer of unsaturated polyester.

10. The laminar structure of claim 8 wherein said polyvinyl fluoride film is biaxially oriented and, prior to bonding, exhibits a finite shrinkage on exposure without restraint at 60° C. of from about 0.2% to about 5.0% in each direction of stretch.

11. A laminar structure consisting essentially of a substrate of cured, fiber-reinforced organic unsaturated polyester containing an ultraviolet light-absorbent compound, and a layer of polyvinyl fluoride film surface activated by electrical discharge in the presence of ammonia integrally bonded to said substrate.

12. The laminar structure of claim 11 wherein said polyvinyl fluoride film is biaxially oriented and, prior to bonding, exhibits a finite shrinkage on exposure without restraint at 60° C. of from about 0.2% to about 5.0% in each direction of stretch.

13. A laminar structure consisting essentially of a substrate of cured, fiber-reinforced organic unsaturated polyester, and a surface of polyvinyl fluoride film integrally bonded to said substrate, said film surface activated by electrical discharge in the presence of ammonia having distributed therein an ultraviolet light-absorbent compound.

14. The laminar structure of claim 13 wherein said polyvinyl fluoride film is biaxially oriented and, prior to bonding, exhibits a finite shrinkage on exposure without restraint at 60° C. of from about 0.2% to about 5.0% in each direction of stretch.

15. A laminar structure consisting essentially of a substrate of cured, glass fiber-reinforced organic unsaturated polyester, and a surface of polyvinyl fluoride film surface activated by electrical discharge in the presence of ammonia integrally bonded to said substrate.

16. The laminar structure of claim 15 wherein said polyvinyl fluoride film is biaxially oriented and, prior to bonding, exhibits a finite shrinkage on exposure without restraint at 60° C. of from about 0.2% to about 5.0% in each direction of stretch.

17. A laminar structure consisting essentially of a substrate of cured, glass fiber-reinforced organic unsaturated polyester containing an ultraviolet light-absorbent compound, and a surface of polyvinyl fluoride film surface activated by electrical discharge in the presence of ammonia integrally bonded to said substrate.

References Cited by the Examiner

UNITED STATES PATENTS

| | | | |
|---|---|---|---|
| 2,875,092 | 2/1959 | Cline | 117—62 |
| 3,018,267 | 1/1962 | Steckler et al. | 161—195 XR |
| 3,022,543 | 2/1962 | Baird et al. | 117—7 |
| 3,030,290 | 4/1962 | Ryan | 204—169 |
| 3,044,913 | 7/1962 | Lundberg | 161—195 XR |
| 3,111,450 | 11/1963 | Stevens | 161—189 |
| 3,135,676 | 6/1964 | Rothacker | 204—168 |
| 3,171,539 | 3/1965 | Holbrook et al. | 204—168 XR |
| 3,188,265 | 6/1965 | Charbonneau et al. | 161—188 |

FOREIGN PATENTS 609,525  11/1960  Canada.

EARL M. BERGERT, *Primary Examiner.*

HAROLD ANSHER, *Examiner.*